(No Model.)
W. H. ALLEN.
METHOD OF CONSTRUCTING ELECTRODES FOR SECONDARY BATTERIES.
No. 415,490. Patented Nov. 19, 1889.
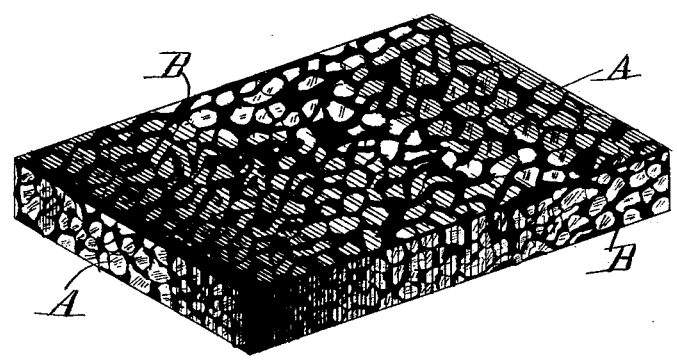
Witnesses:
F. R. Cornwall,
L. S. Bacon
Inventor:
W. H. Allen
per T. S. Sprague & Son,
Attys.

UNITED STATES PATENT OFFICE.

WILLIAM H. ALLEN, OF DETROIT, MICHIGAN.

METHOD OF CONSTRUCTING ELECTRODES FOR SECONDARY BATTERIES.

SPECIFICATION forming part of Letters Patent No. 415,490, dated November 19, 1889.

Application filed August 15, 1889. Serial No. 320,836. (No model.)

*To all whom it may concern:*

Be it known that I, WILLIAM H. ALLEN, a citizen of the United States, residing at Detroit, in the county of Wayne and State of Michigan, have invented certain new and useful Improvements in the Method of Constructing Electrodes for Secondary or Storage Batteries, of which the following is a specification, reference being had therein to the accompanying drawings.

This invention relates to new and useful improvements in the method of making electrodes for secondary batteries, the same consisting in transforming the active material into a suitable cohesive state, breaking it up into small pieces, then filling it into a mold and casting the metal into the interstices left between the pieces of the active material, all as more fully hereinafter described.

In the accompanying drawing, forming a part of this specification, I have shown a perspective view of a plate formed according to my invention, in which A represents the active material, and B the mineral lead filling.

I take the ordinary red lead or other oxide of lead adapted to form the active material, or adapted to become active, mix with it a suitable amount of water, and then press it into cakes. These I dry and break up into irregularly-shaped pieces or lumps, preferably of uniform size, or nearly so, and place them in a mold, being careful to prevent them from being crushed or broken. I then take a suitable base metal—such as metallic lead—melt it and then pour it into the mold, so that it may completely fill the interstices between the pieces of active material. When cold, the casting thus obtained is taken from the mold and cut into plates of suitable size for electrodes. The plates thus obtained present a metallic face provided with numerous pockets filled with the active material which is firmly retained in the pockets.

Instead of mixing the powdered material with water alone, it may be found preferable to make a slight addition of binding material, such as starch, flour, dextrine, or other substance, which by the heat resulting from the casting is ultimately carbonized, and which serves to make the powdered material more cohesive and a better conductor.

Instead of forming irregular pieces by crushing or otherwise, the paste before being dried may be shaped in molds of some irregular or regular form, such as cubes, diamonds, small balls, or other form, and then dried.

What I claim as my invention is—

The herein-described method of making electrodes for secondary batteries, the same consisting in forming the active material, or material to become active, into masses having interstices throughout, and then in running the base metal into the interstices in a molten state, and finally in cutting the blocks so formed into plates of suitable size.

In testimony whereof I affix my signature, in presence of two witnesses, this 2d day of August, 1889.

WILLIAM H. ALLEN.

Witnesses:
A. HAMILTON,
P. M. HULBERT.